United States Patent [19]

Smith et al.

[11] Patent Number: 4,911,423
[45] Date of Patent: Mar. 27, 1990

[54] APPARATUS FOR MULTIPLE LANE STACKING OF FLEXIBLE PRODUCTS

[75] Inventors: David A. Smith, Midland; Clark M. Woody, Bay City, both of Mich.

[73] Assignee: The Dow Chemical Company, Midland, Mich.

[21] Appl. No.: 200,283

[22] Filed: May 31, 1988

[51] Int. Cl.⁴ .............................................. B65H 29/24
[52] U.S. Cl. .................................... 271/279; 198/438; 271/196
[58] Field of Search ............... 271/194, 249, 250, 252, 271/196, 239, 208, 279; 198/438

[56] References Cited

U.S. PATENT DOCUMENTS

| | | | |
|---|---|---|---|
| 2,862,707 | 12/1958 | Voysey | 271/196 X |
| 3,117,500 | 1/1964 | Donahue et al. | |
| 3,683,730 | 8/1972 | Driessen | |
| 4,050,574 | 9/1977 | Chenevard et al. | |
| 4,325,475 | 4/1982 | Spalding | |
| 4,523,671 | 6/1985 | Campbell | |
| 4,588,184 | 5/1986 | Jeschke | 271/252 X |
| 4,668,148 | 5/1987 | Sample | 271/196 X |
| 4,740,813 | 4/1988 | Roy | 271/196 X |

Primary Examiner—Richard A. Schacher

[57] ABSTRACT

The present invention provides a transfer device for receiving a series of flexible products from a single path and delivering the flexible products to a plurality of paths where they can be separately stacked and packaged. The device includes a vacuum transfer drum and apparatus for rotating the drum. The transfer device also includes a rotating product drum for supplying flexible products such as plastic bags in a single row along a path to the drum. Further, the transfer device includes apparatus on the drum for securing the leading edges of the flexible products to the surface of the drum, for shifting selected flexible products transversely from the path as the drum rotates, and for securing the trailing edges of the selected flexible products during the shifting thereof. This transverse shifting of selected flexible products permits delivery by the transfer drum along a plurality of paths.

22 Claims, 3 Drawing Sheets

APPARATUS FOR MULTIPLE LANE STACKING OF FLEXIBLE PRODUCTS

BACKGROUND OF THE INVENTION

This invention relates to apparatus for delivering individual flexible web products, and more particularly to a high speed multiple lane delivery system for thermoplastic containers and bags.

In the production of individual flexible web products such as plastic containers and bags, the bag stock is typically supplied in the form of a continuous web of thermoplastic material which has been folded upon itself to form two plies. In forming individual bags, portions of the thermoplastic material are severed from the web. These severed areas become side seams for the bags and are typically sealed at the same time as they are severed by the use of a heated wire element. The bags are then stacked, counted, and packaged by packing equipment.

The severing and sealing operation typically takes place on a relatively large diameter rotating drum which may contain multiple heated wire severing and sealing elements positioned in grooves located within the outer periphery of the drum. As the drum rotates, different severing and sealing elements are actuated to raise them up to the drum surface to sever and seal a respective portion of the bag stock web. The individual bags are retained on the drum by a vacuum arrangement as the drum rotates. Such drums are large and expensive pieces of equipment. However, they can presently be operated at production speeds in excess of the production speed of the packaging equipment. Present commercial drums are capable of operating simultaneously on a pair of bag webs positioned side-by-side on the drum.

Individual bags are then taken from the drum, stacked, and packaged. Desirably, the packaging operation occurs at the highest possible speed the equipment can be operated to increase productivity of the system. Presently, individual bags are taken from the drum by a smaller transfer drum, also suitably equipped with vacuum capabilities. The vacuum on the bags on the large drum is relieved at an appropriate point, and the bags fall onto the smaller drum where they are held in position by vacuum. At an appropriate point, the vacuum is released and the individual bags are pulled off the smaller drum by an orbital packer or similar device. Again, present commercial equipment is designed to remove pairs of bags simultaneously and package those bags with separate pieces of packaging equipment.

As is conventional, the orbital packing device is provided with a set of packer fingers which move in a circular path in precise timing with the smaller drum so that the fingers remove each successive bag from the drum and stack them. After a predetermined number of bags have been removed, count fingers or other suitable separation means are actuated to separate the continuous stream of individual bags into precounted stacks.

To accomplish this, the count fingers must move from a first position fully out of the stream of bags, to a second position fully in the stream. This movement must be accomplished in the fraction of a second between successive bags as they are delivered from the smaller drum. At high production rates, this time can be less than 0.1 seconds. This results in the production of tremendous acceleration forces on the count fingers as high as 30 times the force of gravity. High inertial forces also effect the remainder of the packaging system for the folding and loading of the product into dispensers. Thus, operation at the design limits of the packing equipment results in high inertial loading which is detrimental to machinery life and results in excessive downtime and maintenance costs.

Attempts have been made in the past to increase the production rates of packing systems by providing multiple lane stacking systems for relatively thick and/or stiff products such as diapers (Campbell, U.S. Pat. No. 4,523,671) and slices of wrapped cheese or meat (Driessen, U.S. Pat. No. 3,683,730). Both Campbell and Driessen teach systems for the side shifting of individual items from a single path to a plurality of paths. However, such systems were not designed for the stacking of relatively thin, flexible products such as plastic bags which may become folded over during side shifting and cause machine jams.

Accordingly, it would be desirable to be able to utilize the capability of the product to produce products at the higher rates that it is capable of and yet maintain or even increase the higher production rates without subjecting the packaging system to such high inertial forces. The need still exists in the art for such a high speed delivery system for relatively thin, flexible products such as plastic bags.

SUMMARY OF THE INVENTION

The present invention meets those needs by providing a transfer device for receiving a series of flexible products from a single path and delivering the flexible products to a plurality of paths where they can be separately stacked and packaged. The transfer device is also capable of receiving a series of flexible products from a plurality of paths and delivering the flexible products to an additional number of paths. In accordance with one aspect of the present invention, the device includes a vacuum transfer drum and means for rotating the drum. The transfer device also includes means for supplying flexible products such as plastic bags in a single row along a path to the drum. In a preferred embodiment, the supplying means is a rotating product drum having one or more rows of individual bags thereon.

Further, the transfer device includes means on the drum for receiving successive flexible products from the supplying means. These means include means for securing the leading edges of the flexible products to the surface of the drum, means for shifting selected flexible products transversely along the longitudinal axis of the drum as the drum rotates, and means for securing the trailing edges of the selected flexible products during the shifting thereof. This transverse shifting of selected flexible products permits delivery of them by the transfer drum along a plurality of paths.

Preferably, the means for securing the leading edges of the flexible products to the surface of the transfer drum includes at least one, and preferably a plurality of vacuum ports on the surface of the drum in communication with a vacuum source. Such vacuum ports are preferably arranged across the width of the drum and spaced to provide a secure grip on the leading edges of the flexible products. Again, preferably, the means for securing the trailing edges of the flexible products to the surface of the transfer drum includes at least one, and preferably a plurality of vacuum ports on the surface of the drum in communication with a vacuum source. Such vacuum ports are also preferably arranged across the width of the drum to secure the trailing edges and prevent the products from folding or wrinkling during the side-shifting operation.

As is conventional in the art, the transfer device includes means located at each of the plurality of paths for removing flexible products from the drum. These means may be orbital packing equipment designed to strip the flexible products from the transfer drum. Separate packing equipment is provided along each of the paths.

In conjunction with the product drum and packing equipment, the present invention provides a high speed multiple lane product delivery system for delivering a series of individual flexible products such as plastic bags along a plurality of paths to a plurality of delivery points for packaging. That delivery system, in a preferred form, includes means for providing a series of individual flexible products to a transfer point and means for transferring individual ones of the flexible products from the transfer point along a plurality of paths to a plurality of delivery points where the products are packed.

The transfer means includes a vacuum transfer drum and means for rotating the vacuum transfer drum. The transfer drum includes a plurality of segments spaced about the periphery of the drum with at least one of the segments being movable transverse to the path of movement of the flexible products. In a preferred form of the invention, every other segment is movable, with the other segments being fixed. The at least one movable segment is adapted to accept certain ones of the flexible products from a transfer point, and the products are delivered to the transfer point by a rotating product drum. The fixed segments accept the other products and deliver them to a delivery point which is in alignment with the original path of the products.

The movable segment or segments include vacuum ports in communication with the vacuum source for securing the leading and trailing edges of the flexible products to the surface of the transfer drum. Means are also included for moving the at least one movable segment transverse to the path of movement of the flexible products to deliver flexible products to one or more delivery points which are spaced transversely from the delivery point at which the other segments on the drum deliver products. The delivery system further includes means such as orbital packing equipment located at each of the delivery points for removing the flexible products from the segments of the transfer drum.

The fixed segments on the transfer drum also include vacuum ports in communication with the vacuum source for securing the leading edges of the flexible products to the drum surface. In a preferred form, the vacuum source includes first and second manifolds, with the first manifold being in communication with the leading edge vacuum ports on both the movable and fixed segments as the transfer drum rotates from the transfer point to deliver individual products to the plurality of delivery points.

The second manifold communicates with the trailing edge vacuum ports on the at least one movable segment during the period in which the at least one movable segment is being moved transversely during rotation of the transfer drum. In this manner, the trailing edges of the flexible products are secured against movement during the shifting operation to prevent the products from folding or wrinkling. The vacuum on the trailing edges is released prior to the delivery point.

Accordingly, it is an object of the present invention to provide a transfer device in a high speed multiple lane delivery system which is capable of providing a series of flexible products along a plurality of output paths. This, and other objects and advantages of the present invention, will become apparent from the following detailed description, the accompanying drawings, and the appended claims.

DESCRIPTION OF THE PREFERRED EMBODIMENTS

Figure 1:
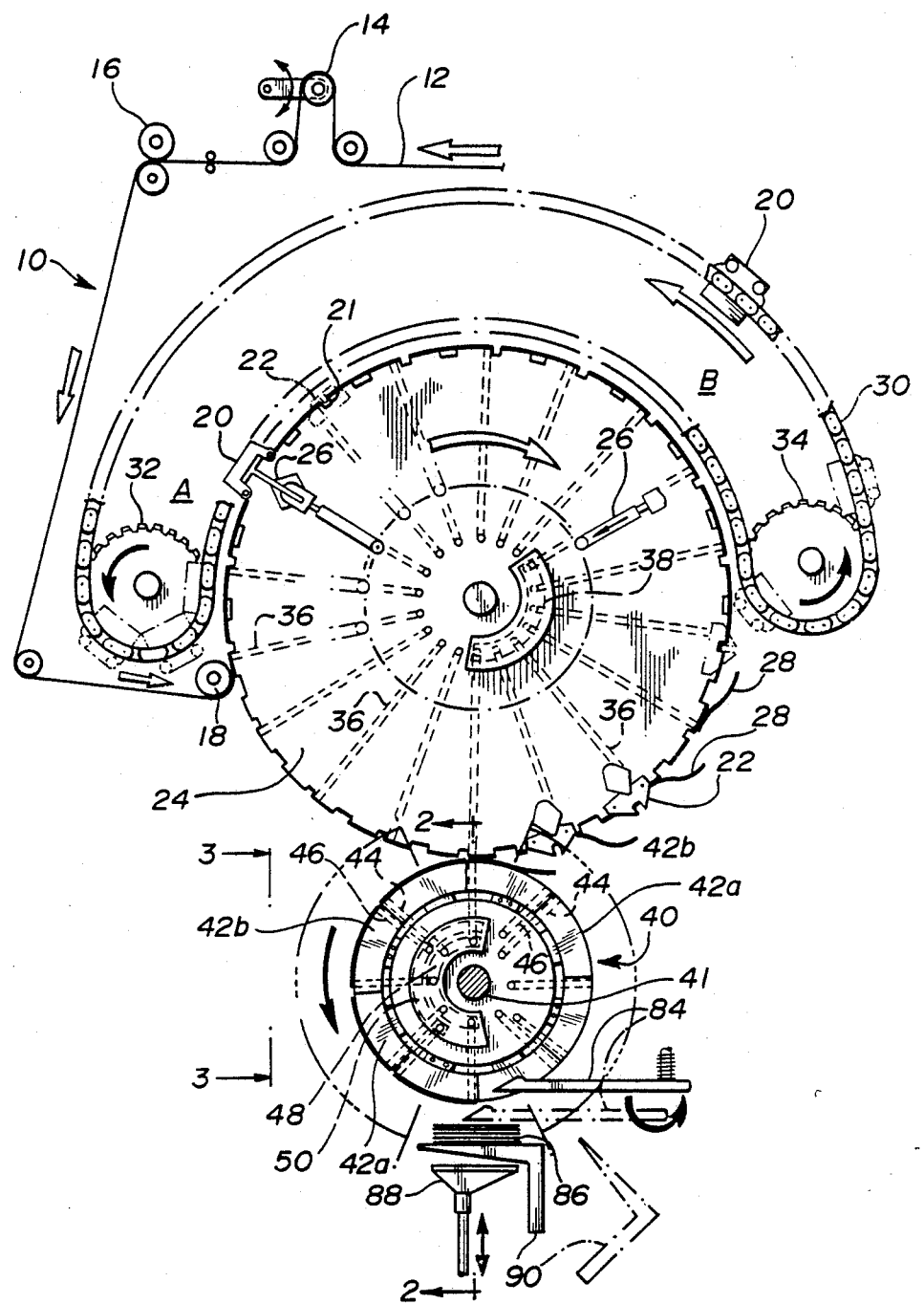
FIG. 1 is a schematic side elevational view of one embodiment of the multiple lane delivery system of the present invention.

Referring now to FIG. 1, the multiple lane product delivery system of the present invention is illustrated in schematic form. Delivery system 10 receives a continuous film web 12 from a spool (not shown) or directly from an extrusion line. While the invention will be described in the context of a thermoplastic film web used to form individual bags or containers, it will be apparent to those skilled in the art that the multiple lane delivery system of the present invention is applicable to other flexible products which are fed from a continuous web and then divided into individual products. For example, a variety of thin, flexible paper or plastic products such as paper napkins and towels may be delivered to packaging equipment by the multiple lane delivery system of the present invention.

Film web 12 may either be a zippered or unzippered bag stock being folded on itself to provide a two ply film. Film web 12 is caused to pass over dancer roll 14 which acts to control film web tension based on its vertical positioning. Film web 12 is then pulled through a draw-roll arrangement 16 which is driven at a speed slightly in excess of the rotational speed of product drum 24. This type of operation permits some slack in the film as it is being fed onto product drum 24. Drum 24 is driven by drive means (not shown) in a conventional manner. In the embodiment illustrated in the drawings, product drum 24 is designed to process two side-by-side plastic film webs simultaneously. However, the invention is applicable to a single stream of individual flexible products leaving the product drum.

The film web 12 then passes over a lay-on roll 18 which is located to position the film web accurately against the rotating product drum surface. If zippered film is being utilized, lay-on roll 18 will have a groove appropriately positioned thereon to accommodate and guide the zippered portion of the film web onto the product drum.

Film web 12 is then severed and sealed on product drum 24 in the following manner. Film web 12 is clamped tightly to the outer surface of product drum 24 at a severing and sealing edge of a heating element slot 21 by seal bar assembly 20. Seal bar assembly 20 is aligned in proper position through the use of yokes 22 on the product drum 24. As product drum 24 rotates in the direction of the arrow, a heated wire severing and sealing element, shown generally at 26, operable through a cam assembly (not shown), emerges from a recess in product drum 24 and severs film web 12 at position A.

The severing and sealing element remains extended for approximately 120 degrees of rotation of the product drum until the severing and sealing element 26 is withdrawn as shown schematically at position B. During the time that the element is extended, the film melts back to the edge of the seal bar assembly 20 and a bead seal forms on the edge of the bag. Individual bags 28 are formed by the severing and sealing of the film web on adjacent seal bar assemblies.

Just prior to the release of the clamping force of the seal bar assembly 20, a vacuum is applied to the leading edge of individual bags 28. Seal bar assembly 20 is removed from the product drum by a continuous chain drive 30 having sprockets 32 and 34 located on opposite sides of product drum 24. The chain drive permits precise positioning of the individual seal bar assemblies 20 along the surface of the product drum.

Individual bags 28 are held in position on rotating product drum 20 by respective vacuum ports 36 which communicate with a central manifold 38. Central manifold 38 in turn communicates with a vacuum source (not shown). As shown, as product drum 24 rotates, vacuum ports 36 are brought into and out of communication with manifold 38. This construction causes a vacuum to be applied to the leading edges of bags 28 beginning at a point just prior to the removal of seal bar assembly 20 until just prior to transfer to transfer drum 40.

Transfer drum 40 is driven by suitable drive means (not shown) through shaft 41. Alternatively, shaft 41 may be fixed, and transfer drum 40 rotated about the shaft. Transfer drum 40 includes a plurality of segments 42a and 42b. In the preferred form of the invention as shown, segments 42a and 42b alternate about the periphery of the drum with segments 42a being fixed while segments 42b are movable transversely to the direction of rotation of drum 40.

Both fixed segments 42a and movable segments 42b include a first set of vacuum ports 44 in communication with a central manifold 48. Manifold 48 is in turn in communication with a vacuum source (not shown). As shown, vacuum ports 44 are positioned to secure the leading edges of each of the respective bags 28 as they are transferred to drum 40. Preferably, the vacuum ports are arrayed across substantially the entire edge of the bags.

Segments 42b also include a second set of vacuum ports 46 which are in communication with a central manifold 50. Manifold 50 is in turn in communication with a vacuum source (not shown). Both manifolds 48 and 50 are part of a housing 47 which is located on the side of drum 40. Vacuum ports 46 are positioned to secure the trailing edges of bags 28 as they are transferred to drum 40. By securing both the leading and trailing edges of bags 28 to the movable segments, wrinkling or folding of the bags is prevented during transverse movement thereof.

While the vacuum ports 46 are shown as a preferred means for securing the trailing edges of bags 28, other suitable means may be employed to accomplish this function. For example, a single vacuum port located on one trailing corner of the bag may be sufficient to secure the trailing edge. Alternatively, vacuum ports may be positioned along a side edge of the bags. A close-fitting guide may be positioned just above the surface of the rotating transfer drum to urge the bags to remain flat or air jets or knives may be positioned to force a stream of air against the bags at an angle which will urge the bags to remain flat. Finally, a static charge may be developed on the drum to hold down the trailing edges of the bags.

As shown, transfer drum 40 is positioned directly beneath product drum 24. This positioning provides operating advantages for the system. Because of the high rotational speeds of both drums (up to 500 feet per minute), the length of time available for the cam to side-shift movable segments 42b to their outermost position and then return them to their initial positions is quite short. By positioning transfer drum 40 directly beneath product drum 24, the arc length from the transfer point between the two drums to the pick-off point at the packing equipment is approximately equal to the return arc length. In this manner, the transverse movement of the cam will not exceed a critical angle of approximately 20°-25° along any point during the rotation of transfer drum 40. Transfer drum 40 may be positioned more to one side of product drum 24. However, the diameter of transfer drum 40 would need to be increased to provide a sufficient arc length to accommodate the transverse movement of the cam. The configuration shown in FIG. 1 is preferred as it permits the use of a transfer drum of minimum diameter and results in savings in materials costs.

Figure 2:
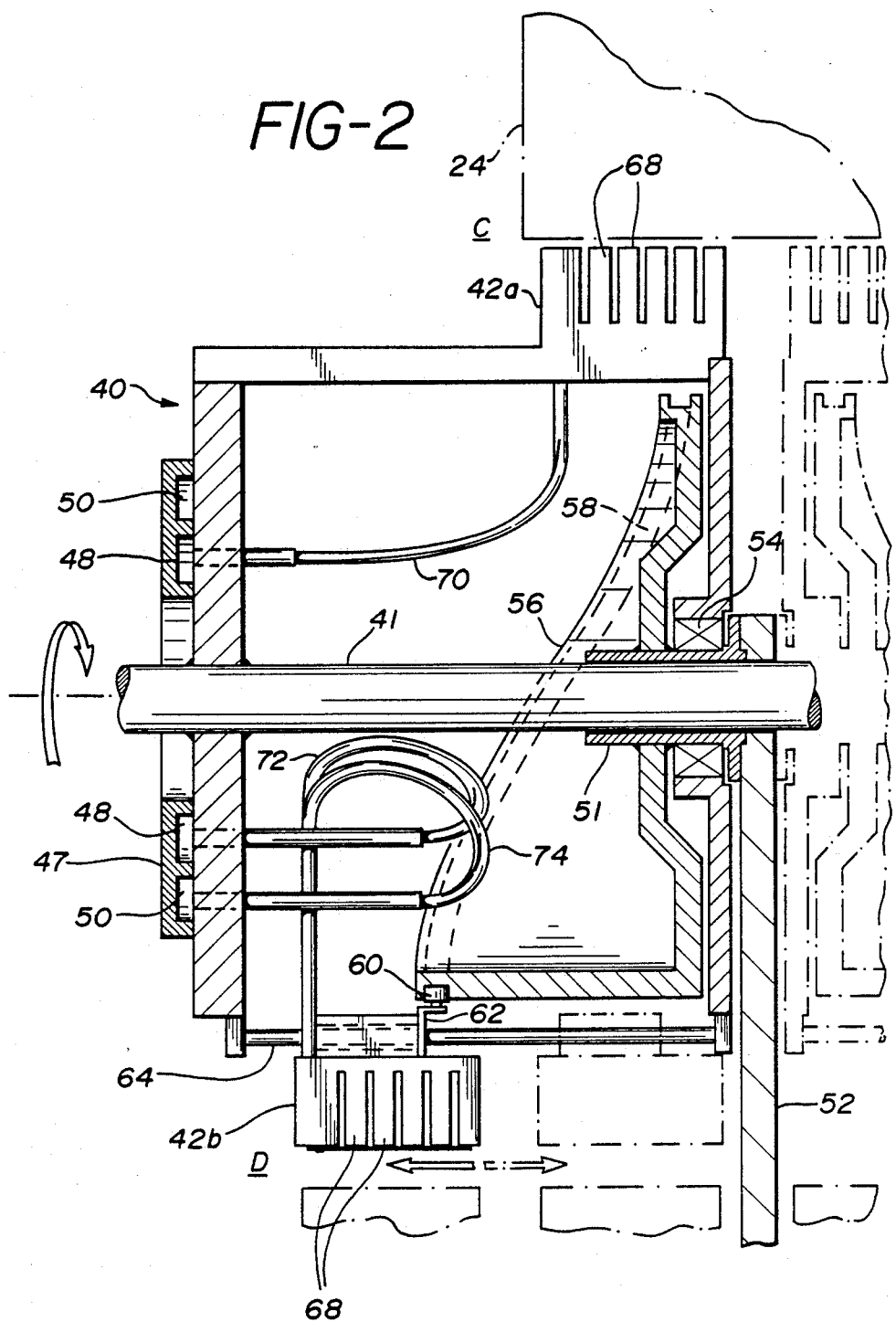
FIG. 2 is a sectional view, taken along line 2—2 in FIG. 1 illustrating one half of the transfer device of the present invention.
Figure 3:
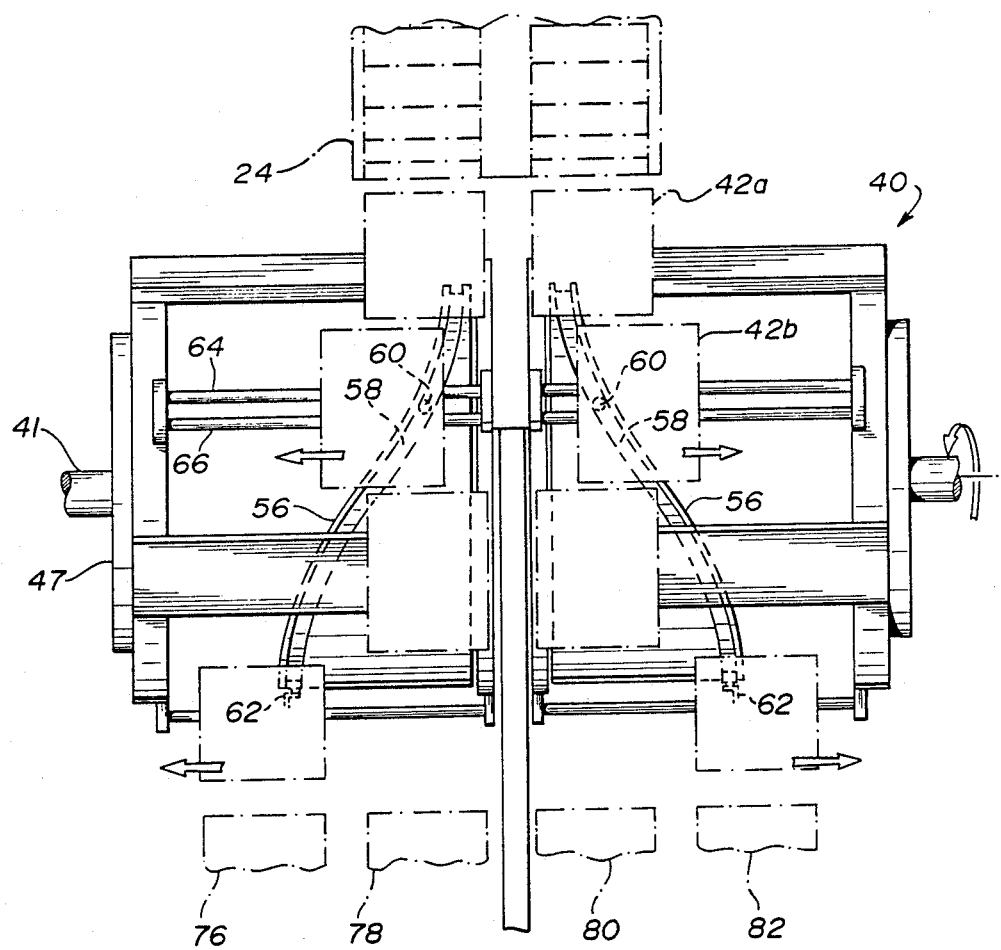
FIG. 3 is a side elevational view of the transfer device taken along line 3—3 in FIG. 1.

Referring now to FIGS. 2 and 3, the structure and operation of transfer drum 40 are illustrated in greater detail. Drum 40 is mounted on drive shaft 41 which is in turn supported in a sleeve 51 secured to center support plate 52. Bearings 54 permit the rotation of drum 40 around fixed sleeve 51. For ease of explanation, only one half of transfer drum 40 is shown in FIG. 2. It will be appreciated that a mirror image of the portion of the drum which is illustrated extends from the opposite side of center support plate 52 and is partially shown in phantom lines.

Positioned within drum 40 is a cam 56 having a cam track 58. Cam 56 is secured to sleeve 51 by suitable means. A cam follower 60 secured to each movable segment 42b, such as by bracket 62, rides in cam track 58. Movable segments 42b are also mounted on bearings or the like for transverse movement on rails 64, 66 (best shown in FIG. 3). Rotation of drum 40 about its longitudinal axis causes movable segments 42b to translate as shown along rails 64, 66 to move from position C, in alignment with bags from product drum 24 at the transfer point between the two drums, to position D, at the opposite side of transfer drum 40.

In a preferred form of the invention, fixed segments 42a have finger segments 68 with gaps therebetween to facilitate removal of the bags 28 by the orbital packing fingers on the orbital packing device as described in greater detail below. Flexible vacuum hose 70 supplies a source of vacuum from manifold 48 to vacuum ports 44 on the surface of segments 42a to secure the leading edges of bags 28 thereto.

Movable segments 42b also preferably include finger segments 68 having gaps therebetween. Flexible vacuum hoses 72 and 74 provide a source of vacuum from manifolds 48 and 50, respectively, to vacuum ports 44 and 46 on the surface of the movable segments. In this manner, both the leading and trailing edges of bags 28 are secured to movable segments 42b.

In operation, pairs of bags 28 are transferred from continuous streams of bags on product drum 24 to transfer drum 40 as the two drums rotate in opposite directions. At the point of transfer, the vacuum on the leading edge of the bag on the product drum is released, and the bag falls onto transfer drum 40 where the leading edge is immediately secured by vacuum ports 44. It will be understood that for this embodiment of the invention that bags will fall sequentially onto either a fixed segment 42a or movable segment 42b. As transfer drum 40 continues to rotate, if the bag is on a movable segment 42b, vacuum ports 46 will be activated to secure the trailing edge of the bag.

As shown in FIG. 3, as drum 40 rotates, both fixed and movable segments 42a and 42b are positioned directly beneath the transfer point on product drum 24. As drum 40 continues to rotate, movable segments 42b will begin to translate laterally as cam 56 causes cam follower 60 to move laterally in cam track 58. At a predetermined point in the rotation of drum 40, movable segments 42b are at their outwardmost position on drum 40, in alignment with packing devices 76 and 82, respectively. Fixed segments 42a continue to rotate in alignment with packing devices 78 and 80 respectively.

As illustrated in FIG. 1, the predetermined point at which movable segments 42b reach their outwardmost travel is approximately 180 degrees from the transfer point between drums 24 and 40. Cam 56 is designed so that after reaching the point of outermost travel and transferring the bags to the packing equipment, movable segments 42b begin to translate inwardly so that they are back into alignment with the streams of bags leaving product drum 24 by the time that drum 40 rotates them back to that position.

In this manner, the two streams of individual bags may be divided into four streams which can then be delivered to separate packing devices 76, 78, 80, and 82. The operation of those packing devices are the same an will be described in greater detail in relation to device 76 as best shown in FIG. 1. As bags 28 are brought around transfer drum 40, the bags secured by vacuum ports 44 hold onto the bags until they reach a nearly horizontal position where the vacuum is released. Also as shown, those movable segments 42b in which the trailing edges of the bags are secured by vacuum ports 46 have that vacuum released preferably before and up the same time as the leading edge vacuum. This preferably occurs just prior to reaching the transfer point and after the segments have been side-shifted to their outermost point. If the leading and trailing edge vacuum ports are turned off at the same time, a single vacuum manifold 48 could be utilized to operate both sets of ports. Additionally, only a single vacuum hose 72 would be required in that event.

In packing device 76, orbital packer fingers 84 pull the individual bags away from the drum surface and deposit the bags into a stack 86 on delivery table 88. At a precise time, count fingers 90 pivot between the position shown in phantom lines completely out of the stream of bags into the position shown to separate the stack 86 of bags into the desired count. The delivery table 88 may be lowered to permit a clamp assembly (not shown) to clamp the stack of bags and transfer it to further conventional equipment for packaging the bags.

It will be apparent, however, that the cam and movable segments may be designed to translate the segments so that the transfer point between drum 40 and the packing devices occurs at some other point during rotation of drum 40. Additionally, while the invention has been described with reference to a system which divides two streams of products into four streams, it will be apparent that other cam arrangements may be designed to produce additional lanes or streams of products for delivery to corresponding packing equipment. For example, the transfer drum may be constructed so that every other pair of products is side-shifted in opposite directions so that a first pair is side-shifted at least one product width to one side while a succeeding producted pair is then side-shifted at least one product width to the opposite side. Alternatively, a dual station transfer drum similar to the embodiment illustrated may be designed so that movable drum segments on one side of the drum are aligned with nonmovable segments on the other side. Other arrangements are also possible and within the scope of the invention.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A high speed multiple lane product delivery system for delivering a series of individual flexible products to a plurality of delivery points comprising:

means for providing a series of individual flexible products to a transfer point, said providing means including a rotating product drum, means for transferring individual ones of said flexible products from said transfer point to a plurality of delivery points, said transfer means including a vacuum transfer drum and means for rotating said vacuum transfer drum, said transfer drum including a plurality of alternating first and second segments, said first segments being movable transverse to the path of movement of said flexible products, said first segments adapted to accept alternating ones of said flexible products from said transfer point and including at least one vacuum port in communication with said vacuum source for securing the leading edges of said flexible products to the surface of said vacuum transfer drum, said second segments adapted to accept alternating ones of said flexible products, means for moving said first segments transverse to said path of movement of said flexible products, whereby said first segments provide flexible products to a first delivery point and said second segments provide flexible products to a second delivery point, and packing devices located adjacent each of said delivery points for removing said flexible products from said vacuum transfer drum, said packing devices including orbital packing fingers to contact and remove said flexible products.

2. The high speed delivery system of claim 1 in which said flexible products are plastic bags.

3. The high speed delivery system of claim 1 in which the trailing edges of said flexible products are secured to said first segments by at least one vacuum port in communication with said vacuum source.

4. The high speed delivery system of claim 1 which includes means located at each of said delivery points for removing flexible products from each of said segments of said transfer drum.

5. The high speed delivery system of claim 3 in which said second segments include at least one vacuum port in communication with said vacuum source for securing the leading edges of said flexible products.

6. The high speed delivery system of claim 5 in which said vacuum source includes first and second manifolds, said first manifold communicating with the leading edge vacuum ports on said first and second segments from said transfer point to said plurality of delivery points.

7. The high speed delivery system of claim 6 in which said second manifold communicates with the at least one trailing edge vacuum port on said first segment from a point just prior to moving said first segments transversely to a point just after said first segments have reached their outermost point.

8. The high speed delivery system of claim 1 in which said vacuum transfer drum is positioned directly beneath said rotating product drum.

9. A high speed multiple lane product delivery system for delivering a series of individual flexible products to a plurality of delivery points comprising:
   means for providing a series of individual flexible products to a transfer point, said providing means including a rotating product drum,
   means for transferring individual ones of said flexible products from said transfer point to a plurality of delivery points,
   said transfer means including a vacuum transfer drum and means for rotating said vacuum transfer drum,
   said transfer drum including a plurality of segments spaced about the periphery of said drum with at least one of said segments being movable transverse to the path of movement of said flexible products, said at least one movable segment adapted to accept certain ones of said flexible products from said transfer point, said movable segment including means for securing the leading and trailing edges of said flexible products to the surface of said vacuum transfer drum, and
   means for moving said at least one movable segment transverse to said path of movement of said flexible products to deliver flexible products to a plurality of delivery points.

10. The high speed delivery system of claim 9 in which said flexible products are plastic bags.

11. The high speed delivery system of claim 9 which includes means located at each of said delivery points for removing flexible products from said segments of said transfer drum.

12. The high speed delivery system of claim 9 in which said means for securing the leading and trailing edges on said movable segment includes at least one vacuum port in communication with said vacuum source and the nonmovable segments include at least one vacuum port in communication with said vacuum source for securing the leading edges of said flexible products.

13. The high speed delivery system of claim 12 in which said vacuum source includes first and second manifolds, said first manifold communicating with the at least one leading edge vacuum port on said segments from said transfer point to said plurality of delivery points.

14. The high speed delivery system of claim 13 in which said second manifold communicates with the at least one trailing edge vacuum port on said at least one movable segment during the period in which said at least one movable segment is being moved transversely.

15. The high speed delivery system of claim 9 including packing devices located adjacent each of said delivery points for removing said flexible products from said vacuum transfer drum, said packing devices including orbital packing fingers to contact and remove said flexible products.

16. The high speed delivery system of claim 9 in which said vacuum transfer drum is positioned directly beneath said rotating product drum.

17. A transfer device for receiving a series of flexible products from a single path and delivering said flexible products to a plurality of paths comprising:
   a vacuum transfer drum,
   means for rotating said drum,
   means for supplying flexible products in a single row along a path to said drum,
   means on said drum for receiving successive flexible products from said supplying means, said means including means for securing the leading edges of said flexible products to the surface of said drum,
   means for shifting selected flexible products transversely from said path as said drum rotates, and
   means for securing the trailing edges of said selected flexible products during the shifting thereof, whereby flexible products are delivered by said drum along a plurality of paths.

18. The transfer device of claim 17 in which said flexible products are plastic bags.

19. The transfer device of claim 17 in which said means for securing the leading edges of said flexible products includes at least one vacuum port on the surface of said drum in communication with a vacuum source.

20. The transfer device of claim 17 in which said means for securing the trailing edges of said flexible products includes at least one vacuum port on the surface of said drum in communication with a vacuum source.

21. The transfer device of claim 17 which includes means located at each of plurality of paths for removing flexible products from said drum.

22. A high speed multiple lane product delivery system for delivering a series of individual flexible products to multiple delivery points comprising:
   means for providing a series of individual flexible products to a plurality of transfer points, said providing means including a rotating product drum having at least two rows of individual flexible products thereon,
   means for transferring individual ones of said flexible products from said transfer points to multiple delivery points,
   said transfer means including a vacuum transfer drum, means for rotating said vacuum transfer drum,
   said transfer drum including a plurality of alternating pairs of first and second segments, said respective pairs of segments positioned in side-by-side relationship,
   said first segments being movable transverse to the path of movement of said flexible products, said first segments adapted to accept alternating ones of each row of said flexible products from said transfer points and including vacuum ports in communication with said vacuum source for securing the leading edges of said flexible products.
   said second segments to accept alternating ones each row of said flexible products, and
   means for moving said first segments transverse to said path of movement of said flexible products, whereby said first segments provide flexible products to a plurality of delivery points and said second segments provide a flexible products to a plurality of different delivery points.

* * * * *

UNITED STATES PATENT AND TRADEMARK OFFICE
CERTIFICATE OF CORRECTION

PATENT NO. : 4,911,423

DATED : March 27, 1990

INVENTOR(S) : David A. Smith, et al

It is certified that error appears in the above-identified patent and that said Letters Patent is hereby corrected as shown below:

Column 2, line 21, after "product" should be --drum--
Column 7, line 5, before "will" should be the number --28--
Column 7, line 34, "an" should correctly appear as --and--

Signed and Sealed this

Fifth Day of November, 1991

Attest:

HARRY F. MANBECK, JR.

*Attesting Officer*      *Commissioner of Patents and Trademarks*